US006915128B1

(12) United States Patent
Oh

(10) Patent No.: US 6,915,128 B1
(45) Date of Patent: Jul. 5, 2005

(54) METHOD AND SYSTEM FOR MONITORING A WIRELESS COMMUNICATIONS NETWORK

(75) Inventor: Dae-Sik Oh, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 772 days.

(21) Appl. No.: 09/782,118

(22) Filed: Feb. 13, 2001

(51) Int. Cl.[7] .............................................. H04Q 7/20
(52) U.S. Cl. .................... 455/424; 455/63.1; 455/67.11; 455/67.13; 455/67.14
(58) Field of Search .............................. 455/63.1, 67.11, 455/67.13, 67.14, 67.7, 423, 424

(56) References Cited

U.S. PATENT DOCUMENTS

| | | | | |
|---|---|---|---|---|
| 5,570,373 A | * | 10/1996 | Wing | 455/423 |
| 5,875,398 A | * | 2/1999 | Snapp | 455/424 |
| 5,913,162 A | * | 6/1999 | Gourdin et al. | 455/424 |
| 5,930,707 A | * | 7/1999 | Vambaris et al. | 455/424 |
| 5,943,617 A | * | 8/1999 | Nakamura | 455/423 |
| 6,169,896 B1 | * | 1/2001 | Sant et al. | 455/424 |
| 6,266,514 B1 | * | 7/2001 | O'Donnell | 455/67.13 |
| 6,272,337 B1 | * | 8/2001 | Mount et al. | 455/423 |
| 6,295,460 B1 | * | 9/2001 | Nagel et al. | 455/557 |
| 6,519,452 B1 | * | 2/2003 | Agostino et al. | 455/423 |
| 6,571,082 B1 | * | 5/2003 | Rahman et al. | 455/67.11 |
| 6,584,175 B1 | * | 6/2003 | Kibria et al. | 379/1.03 |

OTHER PUBLICATIONS

Agilent Technologies, "Solutions for Wireless Network Installation and Operations" printed Mar. 2000.*
Press Release View—QUALCOMM Announces the pdQ Diagnostic Monitor, http://www.qualcomm.com/cda/pr/view/0, 1565, 152,00.html, printed from the World Wide Web on Feb. 1, 2001.

Agilent Technologies, "Optimize your wireless network with Agilent Technologies network optimization solutions," printed Aug. 2000.
Agilent Technologies, "Solutions for Wireless Network Installation and Operations," printed Mar. 2000.
NeoPoint, Inc., http://www.neopoint.com/products/datalogger.asp, printed from the World Wide Web on Feb. 1, 2001.
NeoPoint, Inc., http://www.neopoint.com/products/portablemcs.asp, printed from the World Wide Web on Feb. 1, 2001.
NeoPoint, Inc., http://www.neopoint.com/products/proact.asp, printed from the World Wide Web on Feb. 1, 2001.
NeoPoint, Inc., http://www.neopoint.com/products/measurement.asp, printed from the World Wide Web on Feb. 1, 2001.

* cited by examiner

*Primary Examiner*—William Trost
*Assistant Examiner*—Stephen D'Agosta

(57) ABSTRACT

A method and system for monitoring wireless network conditions. Two mobile stations are coupled with a computer. The first mobile station interacts with the network and thereby establishes diagnostic data concerning network conditions. The first mobile station then reports that diagnostic data to the computer. As the computer receives the diagnostic data from the first mobile station, the computer obtains location data indicative of the current location of the first mobile station. The computer then provides the diagnostic data and corresponding location data to the second mobile station, which in turn transmits the data to a remote entity via the wireless communications network. As the remote entity receives the data, the remote entity may generate output reports and alerts as desired. Conveniently, the combination of the mobile stations and computer may be mounted in a vehicle and carried around a geographic area, so as to automatically report diagnostic data to the remote entity from a variety of locations.

19 Claims, 5 Drawing Sheets

METHOD AND SYSTEM FOR MONITORING A WIRELESS COMMUNICATIONS NETWORK

BACKGROUND

1. Field of the Invention

The present invention relates to wireless telecommunications systems and, more particularly, to monitoring and reporting of network conditions in such a system.

2. Description of Related Art

In a cellular radio communications system (wireless communications network), an area is divided geographically into a number of cell sites, each defined by a radio frequency (RF) radiation pattern from a respective base transceiver station (BTS) antenna. The BTS antennae in the cells are in turn coupled to a base station controller (BSC), which is then coupled to a telecommunications switch or other gateway, thereby facilitating communication with a telecommunications network such as the PSTN (public switched telephone network) or the Internet.

When a mobile station (such as a cellular telephone, pager, or appropriately equipped portable computer, for instance) is positioned in a cell, the mobile station communicates via an RF air interface with the BTS antenna of the cell. Consequently, a communication path is established between the mobile station and the telecommunications network, via the air interface, the BTS, and the gateway.

With the explosive growth in demand for wireless communications, network resources can be stressed. For instance, as the level of call traffic increases in a typical cell site, the likelihood of interference between mobile stations can increase substantially. In response to such an increase in call traffic, the base station of the cell may instruct all mobile stations in the cell to decrease their transmission power, and the base station may itself begin to communicate at a lower power level with each mobile station in the cell. With lower transmission power, however, call quality can diminish, and calls may ultimately be lost.

Further, as cities and landscapes evolve, changes to topography can substantially effect the operation of a wireless network. For instance, as buildings and trees rise or fall in or around a cell site, the radiation pattern of the cell site may change drastically. As a result of new or changed signal reflections, for instance, the signal-to-noise ratio in or around the cell site may become unacceptably low and calls may be dropped.

To help manage the call traffic in congested or evolving areas and in other circumstances, a service provider may make changes to the network, such as by repositioning cell sites, subdividing cell sites into a number of sectors, adding new cell sites, or reallocating frequencies among various coverage areas. However, in order to effectively decide when and where such changes should be made, and to otherwise provide subscribers with acceptable and expected quality of service, a need has arisen to monitor communication resources.

SUMMARY

One way to monitor communication resources is to send technicians out into the field (i.e., into cell sites) with mobile diagnostic measurement (MDM) tools, to collect diagnostic data about network conditions. Once the data is collected, the data can be analyzed, and determinations can then be made about the state of the network and about what changes if any may be required.

One such MDM tool may comprise a combination of a computer and one or more mobile stations connected to the computer via suitable cable connections. The computer can be programmed to send one or more instructions to the mobile stations via the cable connection, so as to cause the mobile station to take various actions and to report various parameter values to the computer. For instance, the computer may instruct the mobile station to initiate a number of phone calls and, for each call, to report to the computer (i) the channel (frequency) used, (ii) the transmit power used, and (iii) an indication of whether the call succeeded or was dropped.

Conveniently, the MDM tool may be carried in a vehicle such as a car, so that measurements can be made at various geographic locations. One technician may drive the vehicle around town, while another technician in the vehicle can operate the MDM tool so as to record information about the network. Upon returning to a central office, the service provider may process data collected in the field and may endeavor to make decisions about system resources. Unfortunately, however, sending any number of technicians around town to conduct diagnostic measurements in this way can be inefficient and undesirable.

An exemplary embodiment of the present invention provides an improved mechanism for monitoring resources in a wireless telecommunications network. According to the exemplary embodiment, a computer may be coupled with two mobile stations, MS-1 and MS-2, one of which may report diagnostic data to the computer and the other of which may function to communicate that diagnostic data over a wireless interface to a central server. Further, the computer may be equipped with a location-determining system such as a GPS (global positioning system) transceiver, for tying the diagnostic data together with an indication of geographically where the data was collected.

In response to instructions from the computer, for instance, MS-1 may periodically or continuously report diagnostic data to the computer. As the computer receives that diagnostic data, the computer may also receive location data indicating the location of MS-1. As the computer receives the diagnostic and location data, the computer may cause MS-2 to transmit the data, via the wireless network, to a central server (e.g., at a central office, for instance). Finally, as the data arrives at the server, the server may compile and map out the data (e.g., by location), thereby facilitating substantially real-time reporting and management of network conditions.

Advantageously, this improved MDM arrangement can be controlled and managed from a remote site, such as from the central server for instance. A technician at the remote site can cause the server to send program-instructions or data to the computer, which may establish or update reporting-functionality such as what diagnostic data the computer should collect from MS-1 and when and how the computer should report the diagnostic data via MS-2 to the server.

As such, the improved MDM arrangement can be conveniently mounted in (or, equivalently, on) a vehicle, such as a city bus, taxicab, or train for instance, in an unobtrusive fashion. As the vehicle moves around a geographic area, the MDM arrangement can thus be made to collect diagnostic data and to report the data to the central server, thereby facilitating centralized analysis and reporting. Further, by mounting many such MDM arrangements in many such vehicles, a service provider can readily collect data concerning network conditions from across a wide geographic region.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Exemplary Architecture

Figure 1:
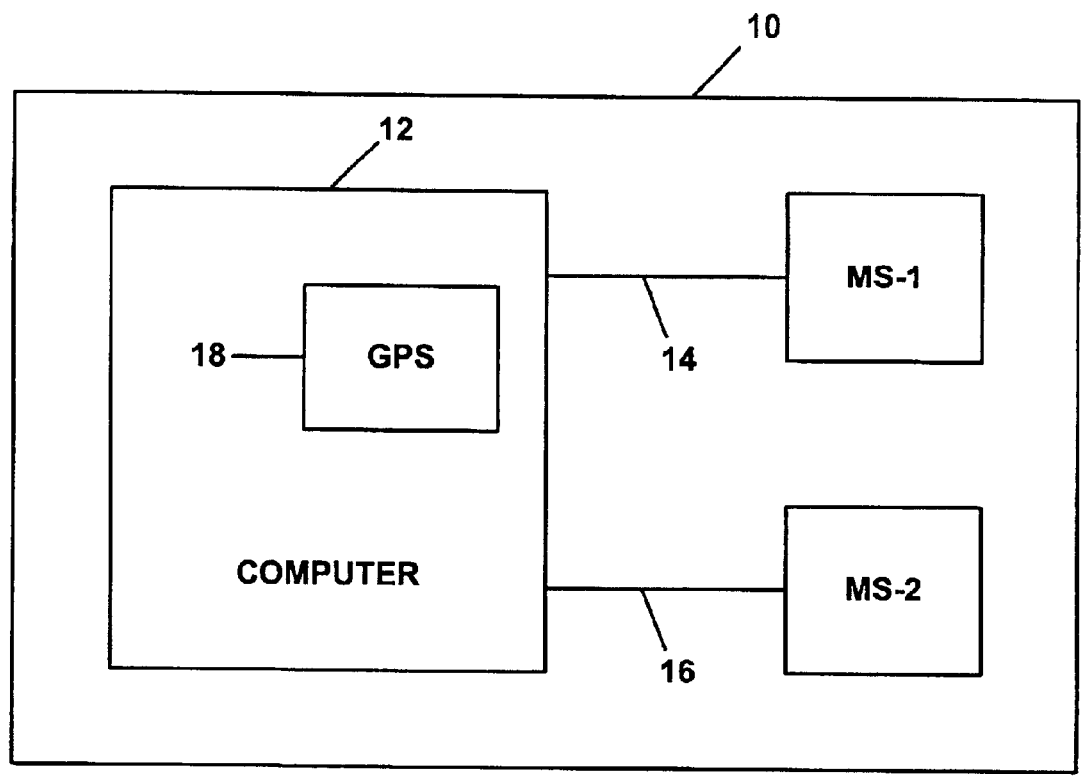
FIG. 1 is a simplified block diagram illustrating a system arranged in accordance with the exemplary embodiment.

Referring to the drawings, FIG. 1 is a simplified block diagram illustrating an MDM system 10 arranged in accordance with an exemplary embodiment of the present invention. As shown in FIG. 1, system 10 includes a first mobile station MS-1, a second mobile station MS-2, and a computer 12. MS-1 may be communicatively coupled with computer 12 by a link 14, and computer 12 may be communicatively coupled with MS-2 by a link 16. In this arrangement, MS-1 can provide information to computer 12 via link 14, and computer 12 can provide information to MS-2 via link 16.

As further illustrated, computer 12 preferably includes or is in communication with a location determining mechanism 18 that allows computer 12 to determine a position of MS-1. Location determining mechanism 18 may most conveniently be a global positioning system (GPS) transceiver, the arrangement of which is well known to those skilled in the art and therefore not described here. Alternatively, mechanism 18 may take other forms as well.

The components of the exemplary embodiment, such as MS-1, MS-2 and computer 12 for instance, may be discrete entities (e.g., separate physical devices or systems). Alternatively, the components may be functional entities (which may also be referred to as a first mobile station function, a second mobile station function, and a computer function). As such, each of the components may take a variety of forms, may be embodied in other entities and may be discrete or distributed. Further, the components may be combined together.

For example, rather than having a separate mobile station MS-1, the functions of MS-1 may be incorporated as part of computer 12 (e.g., by embedding a CDMA chip on a card in computer 12 for instance). As another example, one or more of the functions of computer 12 may be incorporated as part of MS-2 (e.g., employing a host processor or DSP in MS-2 to carry out functions of computer 12). As still another example, the functions of MS-1, MS-2 and computer 12 may integrated together into single entity such as a single mobile station for instance. (In that instance, the combined entity preferably should be able to communicate at a high bandwidth, so as to facilitate substantially concurrent collection and remote-reporting of diagnostic data if desired.) Other examples are possible as well.

Considering the components as discrete entities, links 14 and 16 can take any of a variety of forms, whether wired or wireless. For example, one or both of these links could be a cable connection between a pin-out port on the respective mobile station and a suitable port (e.g., RS-232 or USB) on computer 12. As another example, either or both links could be a wireless interface such as an infrared interface or an RF interface (e.g., a Bluetooth or CDMA interface).

Figure 2:
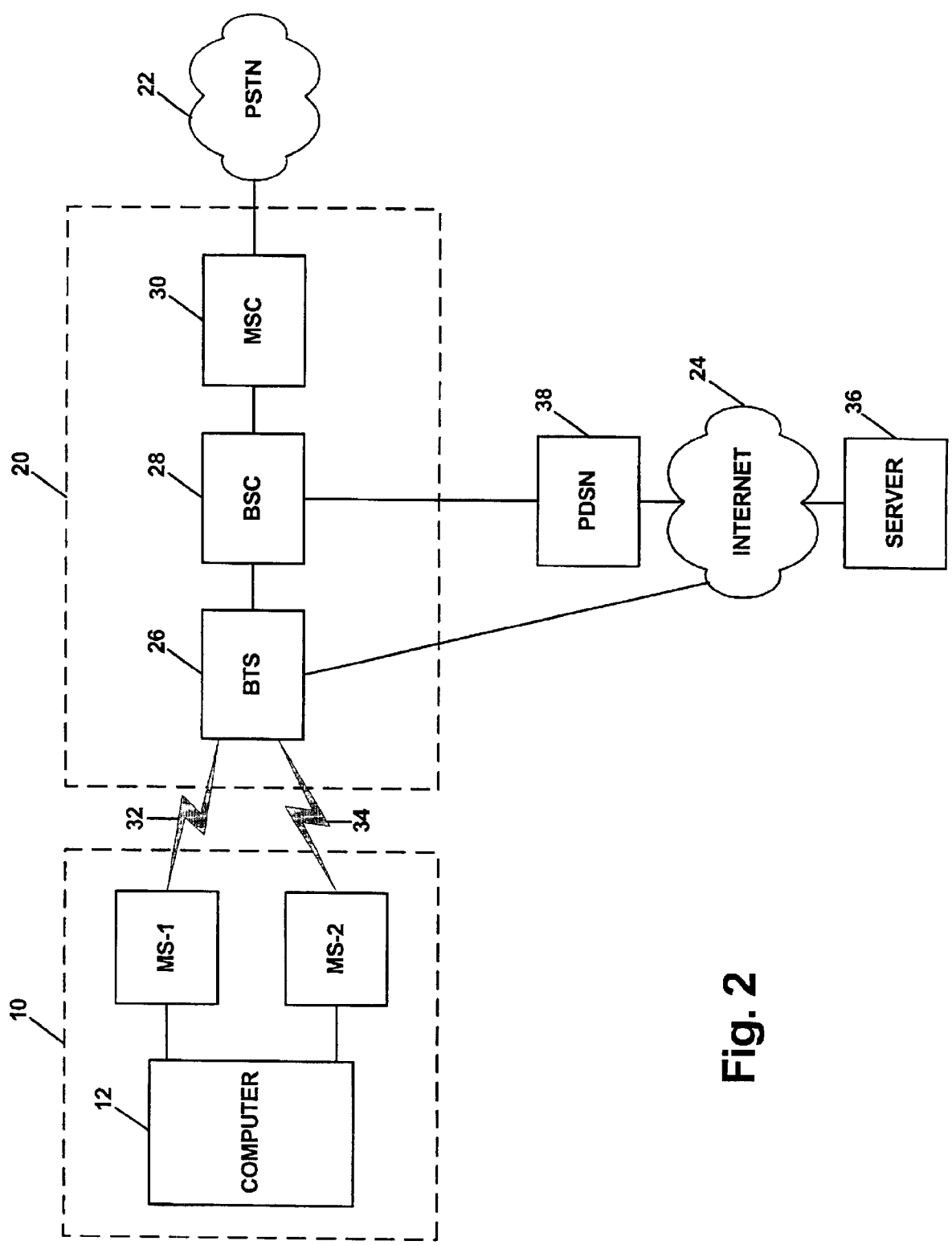
FIG. 2 is a simplified block diagram illustrating a network arrangement employing the exemplary embodiment.

As shown next in FIG. 2, both MS-1 and MS-2 are preferably capable of engaging in wireless communications. In the arrangement shown in FIG. 2, for instance, MS-1 and MS-2 may both communicate with a radio access network 20 that provides connectivity with one or more other networks such as the public switched telephone network (PSTN) 22 and the Internet 24.

As shown by way of example in FIG. 2, radio access network 20 may include a BTS 26, a BSC 28 and an MSC 30. BTS 26 may produce a radiation pattern that defines a cell site in which MS-1 and MS-2 are located. Thus, MS-1 may communicate over an air interface 32 with BTS 26, and MS-2 may communicate over an air interface 34 with BTS 26. BTS 26 may then communicate with BSC 28, and BSC 28 may communicate with MSC 30, which provides connectivity with the PSTN 22.

As further shown, a central server 36 or other such entity may sit as a node on Internet or at another location. In the exemplary embodiment, MS-2 may communicate with the central server 36, so as to receive instructions for computer 12 and/or to convey diagnostic and location data to server 36. The mode of communication between MS-2 and server 36 can take any of a variety of forms, depending, for instance, on where server 36 is located.

If server 36 is located on the Internet, then MS-2 may communicate with server 36 via a suitably arranged packet data serving node (PDSN) or other packet gateway. As shown in FIG. 2, for instance, a PDSN 38 may sit as a node on Internet 24 and may be communicatively coupled with BSC 28. PDSN 38 may effectively function as a PPP (point-to-point protocol) aggregator, in that it may interface between circuit-switched communication on one side and packet-switched communication with the Internet on the other side. Thus, communications may flow between MS-2 and PDSN 38 over a circuit-switched path comprising air interface 34 (e.g., a CDMA interface), BTS 26 and BSC 28, and communications may flow between PDSN 38 and server 36 over a packet-switched path comprising the Internet.

Alternatively, as also shown in FIG. 2, BTS 26 may itself sit as a node on the Internet, and the air interface 34 between MS-2 and BTS 26 may also be a packet-based interface. With such an arrangement MS-2 may engage in pure packet-based communications (e.g., TCP/IP communications), via air interface 34, BTS 26 and Internet 24, with server 36. Other mechanics for communication are possible as well.

Still alternatively, if server 36 sits on the PSTN 22, MS-2 may communicate with the server via a conventional communication path that comprises air interface 34, BTS 26, BSC 28, MSC 30 and PSTN 22 (possibly also through any intermediate network, such as the Internet for instance). In order to facilitate high bandwidth and substantially real-time or instant communication between MS-2 and server 36, however, it would be better to position server 36 on the Internet or other packet-switched network, rather than on the PSTN.

Figure 3:
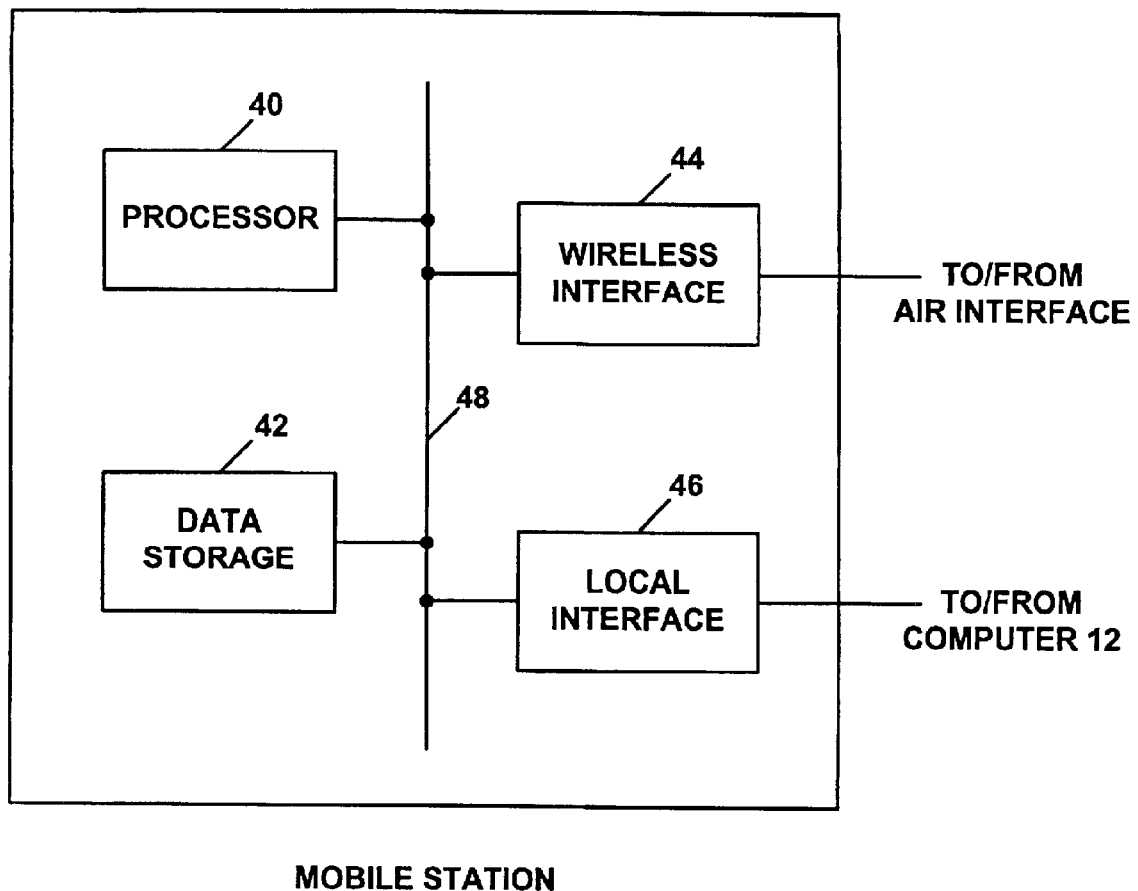
FIG. 3 is a simplified block diagram of a mobile station suitable for use within the exemplary embodiment.

Referring now to FIG. 3, a functional block diagram of an exemplary mobile station, such as MS-1 or MS-2, is shown. As illustrated, the mobile station may include a processor 40, data storage 42, a wireless communications interface 44, and a local communications interface 46, all of which may be coupled together via a system bus 48. Each of these functional components may take any of a variety of forms. Further, MS-1 and MS-2 may be either the same as or different than each other.

Data storage 42, for instance, may function to hold a set of machine language instructions defining program logic executable by processor 40 to carry out various functions described herein. (Alternatively or additionally, the mobile station can embody various combinations of hardware, firmware and software to carry out the functions described.) Further, data storage 42 may function to hold other data, such as diagnostic data for instance. As such, data storage 42 may comprise one or more volatile or non-volatile storage mechanisms, such as flash memory, or optical or magnetic storage, for instance.

Wireless communications interface 44, in turn, may function to establish communications with radio access network 20 via an air interface. As such, wireless communications interface 44 may comprise software logic (e.g., CDMA encoding logic) and/or may comprise a transceiver suitable for interfacing between processor 40 and a radio frequency antenna (not shown).

Local communications interface 44 may function as a port for sending and receiving communications with computer 12. As such, local communications interface 44 may comprise a conventional pin-out port, and infrared port, an Ethernet (RJ-45) port, or any other suitable interface.

In the exemplary embodiment, MS-2 may be at least a 3G (or, more generally, broadband) mobile station, which is able to communicate over a 3G air interface at speeds of up to 153.6 kilobits/second or greater. Air interface 32 (as defined by BTS 26) is then preferably 3G-compliant (i.e., it supports at least 3G communications) as well. With such speeds, MS-2 can readily communicate large amounts of data to and from server 32 (e.g., via FTP), so as to facilitate substantially real-time reporting of diagnostic data to server 32 as well as receipt of instructions and data from server 32. (Alternatively, MS-2 could be a 2G mobile station or otherwise slower than a 3G mobile station, with the understanding that MS-2 might then be unable to provide the preferred level of throughput.) An example of a suitable 3G mobile station is NeoPoint handset model NPN2500 3G1X.

Similarly, MS-1 may also be a 3G mobile station. Alternatively, MS-1 may be a more conventional 2G mobile station (or any other sort of mobile station, for that matter). In the exemplary embodiment, MS-1 may be arranged to engage in communication with the wireless network, in idle and active modes. An example of a suitable 2G mobile station is Qualcomm handset model QCP-2760.

Figure 4:
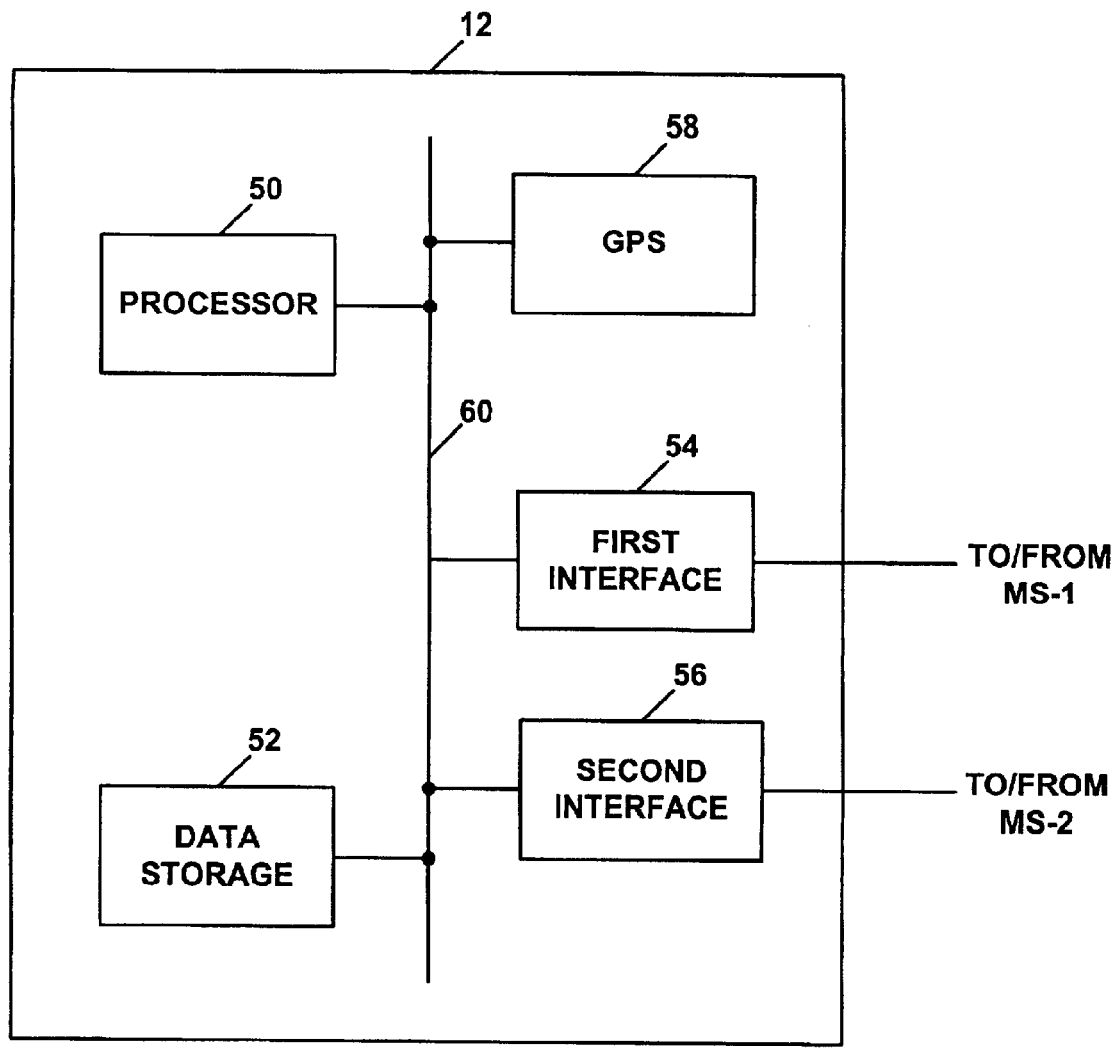
FIG. 4 is a simplified block diagram of a computer suitable for use within the exemplary embodiment.

Referring now to FIG. 4, a functional block diagram of an exemplary computer 12 is shown. As illustrated, computer 12 may include a processor 50, data storage 52, a first communications interface 54, a second communication interface 56 and a location-determining mechanism 58 (e.g., a GPS transceiver or other mechanism), all of which may be tied together via a system bus 60. An example of a suitable computer 12 is the Toshiba Tecra Model 8100, possibly equipped with a GPS transceiver on a PCMCIA card, for instance.

Data storage 52 may function to bold a set of machine language instructions defining program logic executable by processor 50 to carry out various functions described herein. (Alternatively or additionally, the computer can embody various combinations of hardware, firmware and software to carry out the functions described.) By way of example, the program logic may cause computer 12 (i) to request MS-1 to take various actions such as reporting diagnostic data to computer 12, (ii) to obtain location data from mechanism 58, (iii) to transfer the diagnostic and location data to server 36 via MS-2, and (iv) to receive and apply new logic conveyed from server 32 or another entity via MS-2.

Further, data storage 52 may function to hold other data, such as diagnostic data provided by MS-1 and location data provided by mechanism 58, for instance. Thus, data storage 52 might include a set of database program logic (e.g., a Microsoft Jet Engine database such as Microsoft Access) executable by processor 50 for storing data in tables and files (such as *.mdb files).

As such, data storage 52 may comprise one or more volatile or non-volatile storage mechanisms. For example, data storage 52 might comprise flash memory or an optical or magnetic storage medium.

First communications interface 54 may function to enable communications between computer 12 and MS-1, and second communications interface 56 may function to enable communications between computer 12 and MS-2. These interfaces may take any of a variety of forms, possibly depending on the forms of the local communication interfaces provided by MS-1 and MS-2. For example, if the local communications interface of MS-1 is a pin-out connection, then first communications interface 54 could be an RS-232 or USB port (or other wired port), such that a suitably designed cable could connect MS-1 to computer 12. As another example, if the local interface of MS-1 is a Bluetooth RF transceiver, then first communications interface 54 may be a corresponding Bluetooth RF transceiver. Other examples are possible as well.

In the exemplary embodiment, both MS-1 and MS-2 may be arranged to communicate with computer 12 over their respective local interfaces. To facilitate intelligent communication between each given mobile station and the computer, the mobile station and the computer should preferably be programmed with a common message set. Typically, the message set will be specific to the particular mobile station (e.g., as specified by the mobile station manufacturer), and the computer can then be programmed accordingly. Further, the message set employed for communication between MS-1 and computer 12 may be the same as or different than the message set employed for communication between computer 12 and MS-2.

The message set employed for communication between MS-1 and computer 12 may define signals that the computer can send to MS-1 to instruct MS-1 to initiate (e.g., dial) a call, to terminate (e.g., answer) a call, to collect and send diagnostic data to computer 12 (e.g., to report radio-frequency parameters and signaling messages to the computer) and/or to take other actions. Further, the message set may define signals that MS-1 can send to computer 12, so as to acknowledge the instructions and to report diagnostic data to computer 12 (or to autonomously report data).

The message set employed for communication between computer 12 and MS-2 may define signals that the computer can send to MS-2 to instruct MS-2 to initiate or engage in data communication with server 36, so as to report diagnostic and location data to the server. Through this signaling, the computer may thus provide diagnostic and location data to MS-2, and MS-2 may communicate the data to the server. In addition, the message set may define or facilitate communication of new or updated reporting-logic (e.g., new software code, such as Java or Visual Basic scripts or the like) that MS-2 can send to computer 12. The reporting-logic may, for example, direct computer 12 to collect particular data from MS-1, to report particular data to server 36 via MS-2, or to take various other actions.

Server 36, in turn, may be a computer that similarly comprises a processor, a data storage medium, and a communications interface. Server 36 may also comprise or be communicatively coupled (e.g., via a LAN) with a user interface, such as a display screen and keyboard for instance.

In the exemplary embodiment, the server 36 may be programmed to receive and compile diagnostic and location data provided by system 10. For this purpose, if the data is provided to the server as an *.mdb file, for instance, the server may be programmed to execute a Microsoft Access or Microsoft Visual Basic program to read the data from the file, to update suitable rollup tables (e.g., summarizing network conditions at various locations), and to provide output data and reports via the user interface.

Further, server 36 could be programmed to determine whether the data provided by system 10 exceeds a particular threshold (such as reflecting unacceptably low transmission power levels in a given geographic area, for instance) and to responsively generate an alert message indicative of the situation Such an alert message could be displayed via the user interface and/or could be sent to an administrator or other entity via a suitable mechanism such as short message service, e-mail (SMTP) or the like. The server could, of course, be programmed to perform other functions as well or instead.

2. Exemplary Operation

According to an exemplary embodiment, system 10 can be conveniently integrated as a single unit, such as by mounting the computer 12, MS-1 and MS-2 in a suitable housing. Whether or not integrated into a single unit, system 10 can further be mounted on (e.g., attached to, or residing within or on) a vehicle that is likely to traverse a wide geographic area. Examples of such vehicles include, but are not limited to, a bus, a train, a taxicab, a limousine, a delivery truck, or, for that matter, even a private car. As the vehicle travels around a geographic area, system 10 may then automatically collect diagnostic data concerning network conditions and report the data via a wireless network to server 36 or to another entity.

Further, many instances of system 10 may conveniently be mounted on many such vehicles, so as to facilitate collection of diagnostic data concurrently at many geographic locations to a common remote entity (e.g., server 36) or to several remote entities. In this regard, a telecommunications service provider may enter into an agreement with fleet operators or individual vehicle owners, establishing the right of the service provider to mount system 10 in one or more vehicles.

Figure 5:
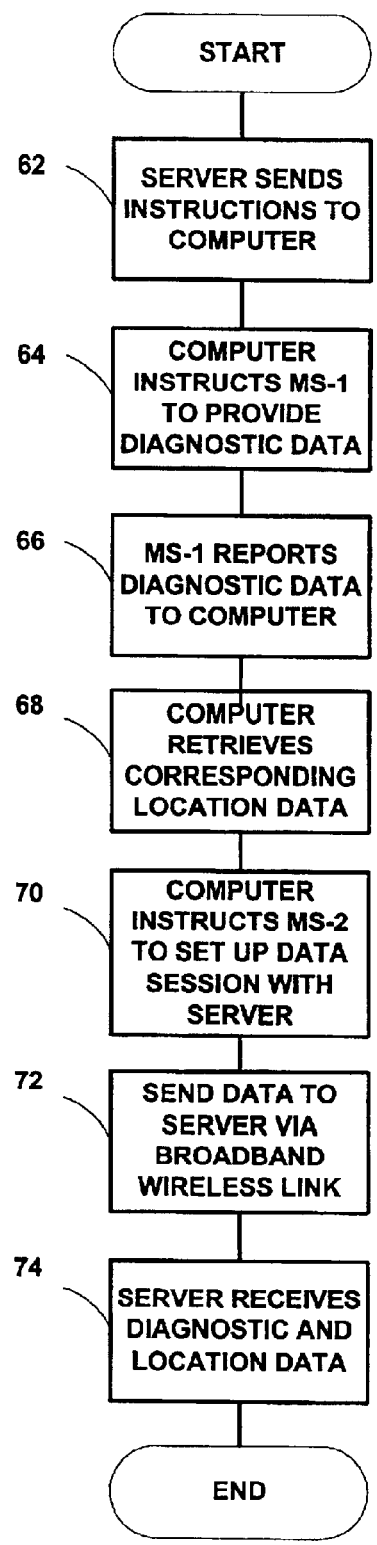
FIG. 5 is a flow chart depicting a set of functions that may be carried out in accordance with the exemplary embodiment.

Referring now to FIG. 5, there is shown a flow chart depicting a set of functional blocks that may be performed in accordance with the exemplary embodiment. As illustrated, at block 62, server 36 (or another entity) may send a set of program instructions to MS-2 for receipt in turn by computer 12. To do this, an administrator operating server 36 may enter commands that cause server 36 to initiate a data session with MS-2 and to then send the program instructions to MS-2 by any suitable means, such as FTP for instance. Through execution of pre-programmed logic (e.g., firmware or software), MS-2 may then responsively convey the program instructions via link 16 to computer 12, where the instructions may then be stored in data storage 52 for execution by processor 50.

At block 64, computer 12 may execute the program instructions provided from server 36, so as to generate and output one or more instruction signals to MS-1. The instruction signals to MS-1 may direct MS-1 to engage in any of a variety of activity such as initiating a call to a predetermined destination or terminating an incoming call. Further, the instruction signals preferably direct MS-1 to report a set (i.e., one or more points) of diagnostic data to computer 12. As a particular example, an instruction (or set of instructions) from computer 12 may direct MS-1 to initiate a series of calls or data sessions to a designated number or address, and to report diagnostic data to computer 12 as each call is made.

At block 66, MS-1 may responsively take the action or actions requested by computer 12 and report diagnostic data to computer 12. The diagnostic data may take any of a variety of forms and may be determined through the interaction of MS-1 with the network. As such, MS-1 may report data established during an idle state (i.e., when MS-1 is not engaged in a call, but is monitoring control channels and the like), during an active state (i.e., when MS-1 is engaged in a call), and/or in other instances as well. Further, the diagnostic data may relate to any aspect of the wireless network in which MS-1 operates. By way of example, the diagnostic data reported by MS-1 could comprise some or all of the following parameters and/or messages:

General
Channel (Frequency)
Access time counter
Redial time counter
Calls remaining counter
Messaging
Access messages
Paging messages
Sync messages
Forward traffic messages
Reverse traffic messages
RF fields (text or graph)
Status (for example, CDMA initialization or CDMA conversation)
State (for example CDMA or analog)
RSSI (mobile received power)
Mobile transmit power
Transmit gain adjust
Pilot increment
FER (frame erasure rate)
$E_c/I_o$
Aggregate
Dominant
PN list
Finger data (TA fingers)
Pilot data
Active Pilot
Candidate Pilot
Neighbor Pilot
Rx/Tx level
Temporal analyzer (TA searcher)
CW power
Channel power
All pilots
TopN pilots
Zoomed pilots
User list of pilots
PN increment
$E_c$
Show value (bar graphs only)
Peak $E_c/I_o$
Peak $E_c$
Aggregate $E_c/I_o$
Aggregate $E_c$
Aggregate-peak
Pilot delay
RLP data throughput and data rate
PPP data throughput
TCP data throughput Upon receipt of the diagnostic data, computer 12 may store the data in a suitable file or other manner in data storage 52, such as a database (e.g., *.mdb) file for instance. Each record in the database might correspond to a particular instance of measurement made by MS-1. For example, if computer 12 had instructed MS-1 to make 100 calls, computer 12 may receive diagnostic data from MS-1 regarding each of the calls, and computer 12 may store that diagnostic data in a respective record in data storage 52.

Further, as computer 12 receives diagnostic data from MS-1, the computer may tally or otherwise analyze the data and supplement the diagnostic data For example, if the computer has instructed MS-1 to initiate a sequence of calls, then as MS-1 reports data to the computer concerning these calls, the computer might tally and compute the following additional diagnostic data:

Total attempts
Total drops
Total blocks
Dropped call rate=total drops/total attempts
Blocked call rate=total blocks/total attempts In turn, the computer may store this additional diagnostic data in data storage 52.

At block 68, as computer 12 receives diagnostic data from MS-1, computer 12 may also retrieve from location-determining mechanism 58 an indication of where MS-1 is currently located, i.e., an indication of a geographic location corresponding to the diagnostic data reported by MS-1. (Location-determining mechanism 58 may provide this location data as latitude and longitude coordinates, together with a GPS time marker, or in other forms.) Thus, for instance, if computer 12 has instructed MS-1 to initiate 100 calls, then, as MS-1 initiates the calls and reports raw diagnostic data to computer 12, computer 12 may determine the location of MS-1 corresponding to each call, and may store that location data in data storage 52 in association with (e.g., in a database record of) the diagnostic data for that call.

At block 70, computer 12 and MS-2 may work together to set up a communication session with server 36. By way of example, computer 12 may generate and output one or more instruction signals to MS-2, which may direct MS-2 to set up a reverse-link data call to the IP address of server 36 on Internet 24. MS-2 may then responsively set up the reverse-link data call as instructed. As a result, a communication session may be established between computer 12 and server 36 via a communication path comprising link 16, MS-2, air interface 34, BTS 26, BSC 28, PDSN 38 and Internet 24.

In turn, at block 72, computer 12 may communicate diagnostic data and location data to server 36. This communication may could take various forms. In the exemplary embodiment, for instance, the computer may send the data to the server via FTP. For example, if the diagnostic data and location data is recorded in an *.mdb file, the computer may send that *.mdb file to the server as an FTP transfer. In communicating the data to the server, computer 12 will communicate the data to MS-2, and MS-2 will then communicate the data along the remainder of the communication path to server 36.

In the exemplary embodiment, the computer may cause MS-2 to communicate diagnostic and location data to server periodically, at scheduled times, upon request from server 36, or at any other designated times. By transmitting the latest data to server 36 at small time intervals, server 36 may effectively receive a continuous stream of data from system 10, representing network conditions at various locations.

In the exemplary embodiment, as noted above, air interface 34 supports a broadband (or, generally, a high bandwidth or high speed) connection between MS-2 and BTS 26. Further, the remainder of the communication channel between MS-2 and server 36 preferably also supports a broadband connection. Consequently, when MS-2 sends data to server 36, the data can be sent quickly and efficiently.

At block 74, server 36 may receive the diagnostic and location data from system 10. Upon receipt of that data (and regularly upon receipt of additional such data from instances of system 10), the server may then execute software instructions so as to read the data and to update any applicable rollup tables or reports (based on the rollup tables, for instance). An example of a report may be a map that graphically designates signal levels, frequency allocation and other data about the network throughout a geographic area Another example may be a bar chart or a table that summarizes such data. Other examples are possible as well.

The reports can then be presented on a display screen in real-time for viewing by an administrator. Further, the server may provide the administrator with access to the raw data, so that the administrator may run queries and generate custom reports and other output, as desired.

In addition, the server may programmatically analyze the data provided by system 10 to determine whether the data satisfies one or more thresholds or tests. If the server finds that the data satisfies a particular threshold or test, the server may generate an alert message and provide the alert message to a designated entity. The server may display the alert on a display screen. Alternatively, the server may send an alert message via any suitable messaging scheme, such as e-mail (e.g., SMTP), short message service (SMS), instant messaging, or the like.

For example, as the server receives the data, the server may determine whether the data reflects one or more dropped calls. In response to a finding that the data reflects at least one dropped call in a given geographic location, the server may display an alert dialog box (a window) for viewing by an administrator. The alert dialog box may indicate the number of dropped calls and the geographic location in which the dropped call(s) occurred. Alternatively, or additionally, the server may responsively (e.g., automatically) send an e-mail message to a technician responsible for handling dropped call problems in the given location. Other examples of threshold tests may include frame error rate exceeding 2%, receive-signal strength dropping below a predetermined level, or $E_c/I_o$ reaching the T_drop level, for instance.

Provided with the benefit of access to diagnostic and location data reported via a wireless interface from one or more instances of system 10, a server or administrator (or other entity) can readily take appropriate action to remedy problems in the network.

3. Conclusion

An exemplary embodiment of the present invention has been described above. Those skilled in the art will understand, however, that changes and modifications may be made to this embodiment without departing from the true scope and spirit of the present invention, which is defined by the claims.

For example, although not expressly described above, server 36 could itself be a mobile station (e.g., communicatively coupled with Internet 24 in substantially the same way that MS-2 is in communication with Internet 24). That way, an administrator or technician could receive reports of diagnostic data per location as the administrator or technician moves around from cell site to cell site (or elsewhere). Other examples are possible as well.

I claim:

1. A monitoring method for a wireless communications network, the monitoring method comprising, in combination:

communicating from a first mobile station to a computer a set of diagnostic data communicating operation of a wireless network;

communicating the diagnostic data from the computer to a second mobile station;

communicating the diagnostic data from the mobile station to a remote entity, via a communication path comprising an air interface;

receiving into the computer location data indicative of a location of the first mobile station corresponding to the diagnostic data;

communicating the location data from the computer to the second mobile station;

communicating the location data from the second mobile station to the remote entity via the communication path, thereby indicating to the remote entity the location of the first mobile station corresponding to the diagnostic data, wherein the diagnostic data and the location data are communicated together to the remote entity, wherein communication the diagnostic data and location data comprises sending the diagnostic data and location data via FTP to the remote entity; and upon receipt of the diagnostic data and location data at the remote entity;

analyzing the diagnostic data;

determining that at least a portion of the diagnostic data meets a threshold; and responsively providing an alert message.

2. The monitoring method of claim 1, further comprising, in combination:

communicating reporting-logic to the second mobile station via a communication path comprising an air interface; and communicating the reporting-logic from the second mobile station to the computer.

3. The monitoring method of claim 2, wherein the remote entity communicates the reporting-logic to the second mobile station.

4. The monitoring method of claim 1, wherein receiving location data comprises receiving the location data from a GPS transceiver.

5. The monitoring method of claim 1, wherein the diagnostic data comprises radio frequency parameters.

6. The monitoring method of claim 1, wherein the air interface is G3-compliant.

7. The monitoring method of claim 1, further comprising, after receipt of the diagnostic data and location data at the remote entity:

providing an output report indicative of at least the diagnostic data.

8. The monitoring method of claim 1, further comprising:

mounting a combination of the first mobile station, the second mobile station and the computer on a vehicle;

driving the vehicle around a geographic area; and repeating at a plurality of locations throughout the geographic area the steps of:

i) receiving, into the computer location data indicative of a location of the first mobile station corresponding to the diagnostic data;

ii) communicating the location data from the computer to the second mobile station;

iii) communicating the location data from the second mobile station to the remote entity via the communication path;

whereby diagnostic data corresponding to the plurality of locations is reported to the remote entity.

9. The monitoring method of claim 8, further comprising entering into an agreement with an owner or operator of the vehicle, establishing that the vehicle will carry the combination around the geographic area.

10. A monitoring method for a wireless communications network, the monitoring method comprising, in combination:

communicating from a first mobile station to a computer a set of diagnostic data concerning operation of a wireless network;

communicating the diagnostic data from the computer to a second mobile station;

communicating the diagnostic data from the mobile station to a remote entity, via a communication path comprising an air interface;

mounting a combination of the first mobile station, the second mobile station and the computer on a vehicle;

driving the vehicle around a geographic area; and repeating at a plurality of locations throughout the geographic area, the steps of:

i) receiving into the computer location data indicative of a location of the first mobile station corresponding to the diagnostic data;

ii) communicating the location data from the computer to the second mobile station; and iii) communicating the location data from the second mobile station to the remote entity via the communication path, thereby indicating to the remote entity the location of the first mobile station corresponding to the diagnostic data;

whereby diagnostic data corresponding to the plurality of locations is reported to the remote entity; and entering into an agreement with an owner or operator of the vehicle, establishing that the vehicle will carry the combination around the geographic area.

11. The monitoring method of claim 10, further comprising, in combination:

communicating reporting-logic to the second mobile station via a communication path comprising an air interface; and communicating the reporting-logic from the second mobile station to the computer.

12. The monitoring method of claim 11, wherein the remote entity communicates the reporting-logic to the second mobile station.

13. The monitoring method of claim 10, wherein the diagnostic data and location data are communicated together to the remote entity.

14. The monitoring method of claim 13, wherein communicating the diagnostic data and location date comprises sending the diagnostic data and location data via FTP to the remote entity.

15. The monitoring method of claim 14, wherein the air interface is G3-compliant.

16. The monitoring method of claim 10, wherein receiving location data comprises receiving the location data from a GPS transceiver.

17. The monitoring method of claim 10, wherein the diagnostic data comprises radio frequency parameters.

18. The monitoring method of claim 10, further comprising, upon receipt of the diagnostic data and location data at the remote entity:

analyzing the diagnostic data;

determining that at least a portion of the diagnostic data meets a threshold; and responsively providing an alert message.

19. The monitoring method of claim 10, further comprising, after receipt of the diagnostic data and location data at the remote entity;

providing an output report indicative of at least the diagnostic data.

* * * * *